(12) United States Patent
Nakamura

(10) Patent No.: US 6,559,572 B2
(45) Date of Patent: May 6, 2003

(54) STATOR CORE OF VEHICLE ROTARY ELECTRIC MACHINE AND METHOD OF MANUFACTURING THE SAME

(75) Inventor: Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/827,213

(22) Filed: Apr. 6, 2001

(65) Prior Publication Data

US 2001/0030484 A1 Oct. 18, 2001

(30) Foreign Application Priority Data

Apr. 14, 2000 (JP) ........................... 2000-113966
Nov. 27, 2000 (JP) ........................... 2000-359639

(51) Int. Cl.$^7$ ............... H02K 1/12; H02K 1/00; H02K 15/00
(52) U.S. Cl. ................. 310/254; 310/216; 310/42
(58) Field of Search ................ 310/179, 254, 310/216, 217, 218, 258, 180, 42; 29/596

(56) References Cited

U.S. PATENT DOCUMENTS

| 3,842,493 A | | 10/1974 | Ohuchi et al. ............... 29/596 |
|---|---|---|---|
| 3,886,256 A | * | 5/1975 | Ohuchi et al. ............... 310/216 |
| 4,260,925 A | * | 4/1981 | Barrett ........................ 310/216 |
| 4,665,329 A | * | 5/1987 | Raschbichler ................ 310/13 |
| 6,023,119 A | | 2/2000 | Asao .......................... 310/216 |
| 6,049,153 A | * | 4/2000 | Nishiyama et al. ..... 310/156.53 |
| 6,208,060 B1 | * | 3/2001 | Kusase et al. ............... 310/254 |

FOREIGN PATENT DOCUMENTS

| EP | 0961 384 | 12/1999 |
|---|---|---|
| JP | 48-24204 | 3/1972 |
| JP | 57085552 | 5/1982 |
| JP | 11-299136 | 10/1999 |

\* cited by examiner

Primary Examiner—Nestor Ramirez
Assistant Examiner—Guillermo Perez
(74) Attorney, Agent, or Firm—Oliff & Berridge, PLC

(57) ABSTRACT

Each tooth of a stator core has circumferential projections at an inner tooth edge and circumferential notches at a base portion adjacent to a core back. A width of the teeth at the base portion is larger than a width of the same at the tooth edge. Therefore, the magnetic reluctance of the teeth does not increase. In addition, a plurality of the magnetic strips can be formed from a long and thin magnetic sheet. This increases the yield percentage of the magnetic strip and reduces a manpower of manufacturing the magnetic strip. Further, the notches make it easy to wind the magnetic strip into a cylindrical core.

7 Claims, 7 Drawing Sheets

STATOR CORE OF VEHICLE ROTARY ELECTRIC MACHINE AND METHOD OF MANUFACTURING THE SAME

CROSS REFERENCE TO RELATED APPLICATION

The present application is based on and claims priority from Japanese Patent Applications: 2000-113966, filed April 14 and 2000-359639, filed Nov. 27, 2000; the contents of which are incorporated herein by reference.

BACKGROUND OF THE INVENTION

1. Field of the Invention

The present invention relates to a stator core of a vehicle rotary electric machine, such as an AC generator, to be mounted in a passenger car, a truck, etc.

2. Description of the Related Art

In order to supply an inexpensive vehicle rotary machine, a magnetic stator core is usually comprised of a spirally wound magnetic strip. Such a stator core can provide a high yield percentage magnetic material and can be manufactured at a high manufacturing speed.

In order to meet a recent demand for a high power generator, conductors are to be disposed in the slots of the stator core at as a high space factor as possible.

As shown in JP-A11-299136, a pair long and thin magnetic sheets is stamped out to form a pair of magnetic strips that has a plurality of teeth and a core back. In order to increase the yield percentage of the magnetic strips, the teeth of one of the pair of magnetic strips are respectively formed from portions inside slots of the other magnetic strip. Thereafter, each the magnetic strip is spirally wound into a cylindrical stack with the slots of one layer being aligned with those of another layer until the cylindrical stack has a prescribed thickness. Then, the stack is welded or riveted. Because two or more magnetic strips are formed at one time, the manpower and cost for manufacturing the stator cores can be reduced.

In order to moderate stress of a magnetic strip when it is spirally wound, JP-A48-24204 discloses teeth whose tooth width becomes narrower toward the core back. In other words, slot width is widened at the middle thereof. This reduces strain of the strip when it is spirally wound and makes the size and shape of a cylindrical stator core accurate.

Because the magnetic reluctance of the air gap between the rotor and the stator is the largest in the magnetic circuit of a generator, the tooth edge formed at the inner periphery of the stator has a wider cross-section of a magnetic path than the rest of the tooth. In other words, each tooth has a pair of circumferential projections to increase the width of the tooth.

As the space factor of the conductors increases, the slot area is narrowed to thereby widen the cross-section of the tooth. If the teeth of one of the pair of magnetic strips are respectively formed from portions inside slots of the other magnetic strip as disclosed in JP-A-299136, it is not possible to provide such a circumferentially wide tooth.

If the tooth width is narrowed at the middle thereof as shown in JP-A-48-24204, a widened tooth edge of one of a pair of magnetic strips can be formed from the portion inside a widened slot of the other magnetic strip. However, if the tooth is narrowed at the middle, the magnetic reluctance of the teeth increases, and the magnetic flux flowing through the stator core decreases significantly. This lowers the output power.

A stator core of a vehicle AC generator that has an outside diameter between 90 mm and 140 mm is usually comprised of a laminated steel strip of a thickness between 0.5 mm and 1.0 mm. It is necessary to have a margin (or clearance) if teeth and slots are formed from a steel strip of the above thickness.

However, if the thickness is reduced to a thickness less than 0.2 mm, the edge of the sheet may be drawn because of the low rigidity thereof. As a result, the projections of the tooth edge can not have proper length, and a sufficient cross-section of the magnetic flux from the rotor can not be provided.

SUMMARY OF THE INVENTION

Therefore, a main object of the invention is to provide a powerful and inexpensive vehicle rotary electric machine having a stator core that is free from the above problems.

In other words, the invention is to provide a stator core of a powerful vehicle rotary machine that can be manufactured at a high yield percentage and a high speed.

In more detail, the invention is to improve the yield percentage of the magnetic strip forming the stator core, to reduce manpower of manufacturing the magnetic strip, to reduce the magnetic reluctance of the stator core and to improve the space factor of the conductor coils.

According to a main feature of the invention, each of teeth of the stator core has at least a circumferential projection at a tooth edge thereof and at least a circumferentially extending notch at a base portion thereof, and a circumferential width of the teeth at the base portion is wider than a circumferential width of the teeth at the tooth edge from which the circumferential projection extends.

According to the above structure, the cross-section of the teeth at the middle thereof is not narrower than the cross-section at the base thereof. This shape prevents the magnetic reluctance thereof from increasing. In addition, it is possible to manufacture a plurality of magnetic strips from a long magnetic sheet.

As a result, the yield percentage of the magnetic strip can be improved and the manpower for manufacturing the magnetic strip can be reduced. In addition, the magnetic strip can be wound easily because of the notches.

According to another feature of the invention, the notch and projection are complementary to each other in shape before the magnetic strip is spirally wound, and the radial width of the notch is reduced after the strip is wound. Therefore, the yield percentage of the magnetic strip is drastically improved. Because the radial width of the notch is automatically reduced when the magnetic strip is wound, the magnetic reluctance from the teeth to the core back can be reduced.

According to another feature of the invention, the slot has parallel walls facing each other in circumferential directions. Therefore, it is easy to align the conductors in the slots, resulting in improvement of the space factor.

According to another feature of the invention, the magnetic strip is thicker than 0.2 mm and thinner than 0.5 mm. This thickness makes it possible to form the magnetic strips with small marginal portions and to stamp out two magnetic strips at once at a reduced cost and prevents the tooth edge from deforming.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

The invention can be applied to a vehicle rotary electric machine such as a generator or a motor. For example, it is mounted in an engine and driven by the engine as an AC generator. It is also mounted in an engine as a motor. Some vehicle AC generators as applications of the vehicle rotary electric machine according to embodiments of the invention are described with reference to the appended drawings, hereafter.

A stator core of a vehicle AC generator according to a first embodiment of the invention is described with reference to FIGS. 1–5.

Figure 3:
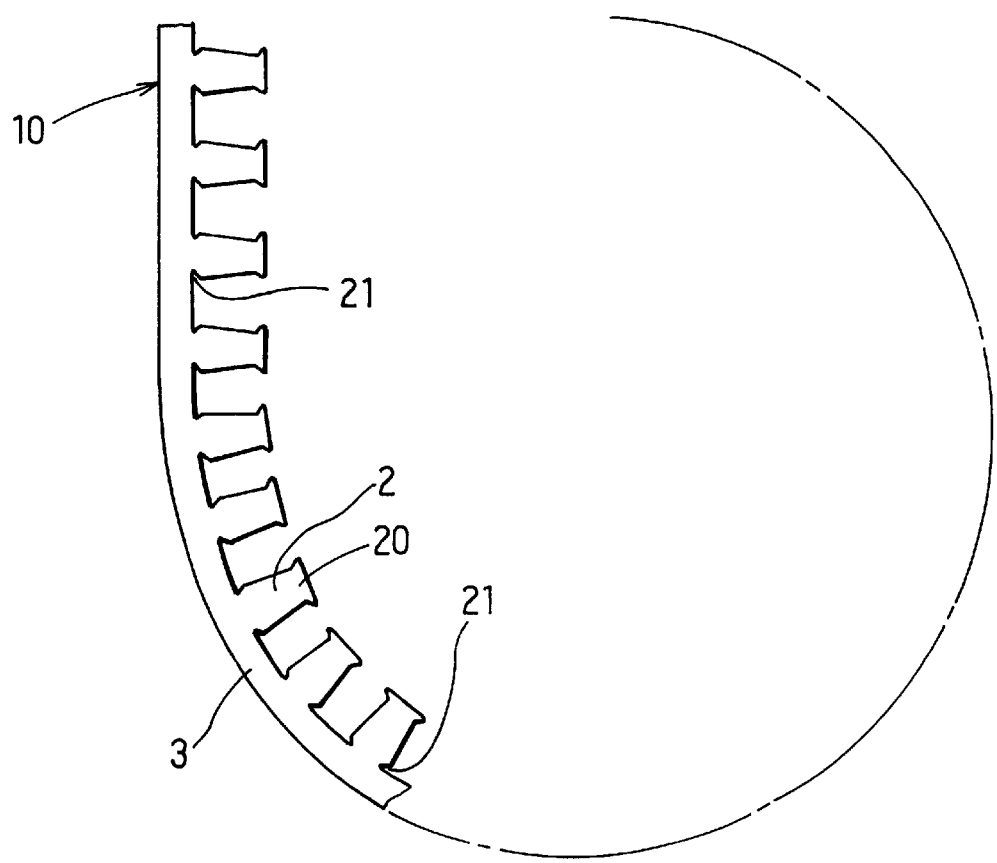
FIG. 3 is an explanatory diagram showing a step of spirally winding the magnetic strip according to the first embodiment.
Figure 4:
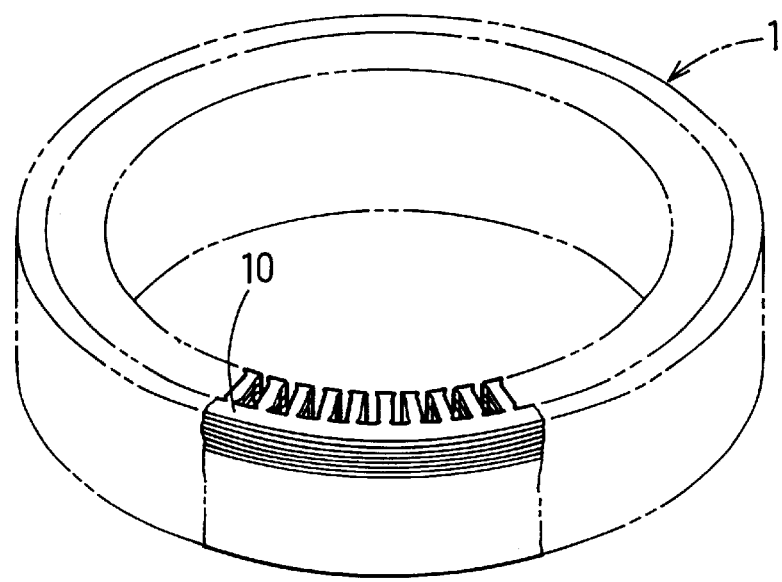
FIG. 4 is a perspective view of the stator core according to the first embodiment.

A cylindrical stator core 1 is comprised of a spirally wound and laminated magnetic strip 10 that is as thick as 0.35 mm. The magnetic strip 10 has a plurality of teeth 2 and a core back 3 from which the plurality of teeth 2 extends. When wound and laminated, tooth edges 20 of teeth 2 are disposed radially inside, as shown in FIG. 3.

Figure 5:
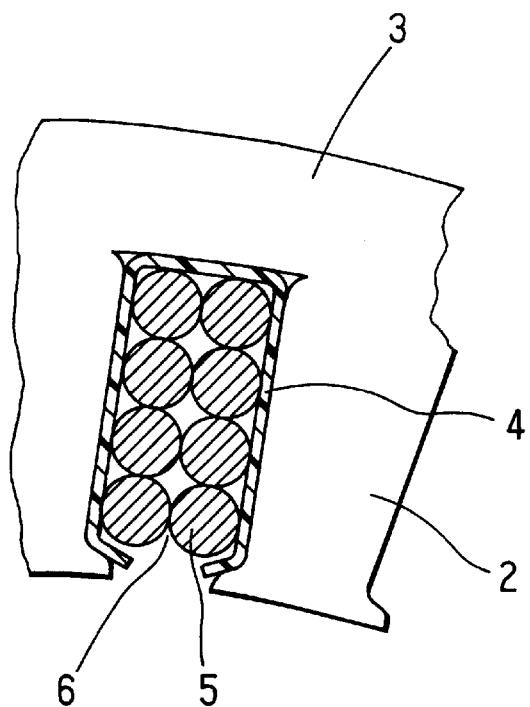
FIG. 5 is a fragmentary cross-sectional view of the stator core according to the first embodiment.

A plurality of conductor coils 5 is disposed in each slot 6 formed between a pair of adjacent teeth 2, as shown in FIG. 5, so that an electromotive force can be generated in the conductor coils 5 when a rotor having a field coil (not shown) supplies an alternating magnetic flux. A pair of circumferential notches 21 is formed at opposite sides of a base portion of each tooth 2 adjacent to the core back 3. A width B of the base between the notches 21 is set larger than a minimum width A between a pair of circumferential projections 201 formed at the tooth edge 20. Each slot 6 has a pair of walls 23 and 24 facing each other in the circumferential direction. The pair of walls 23 and 24 becomes parallel after the magnetic strip 10 is wound up.

Figure 1:
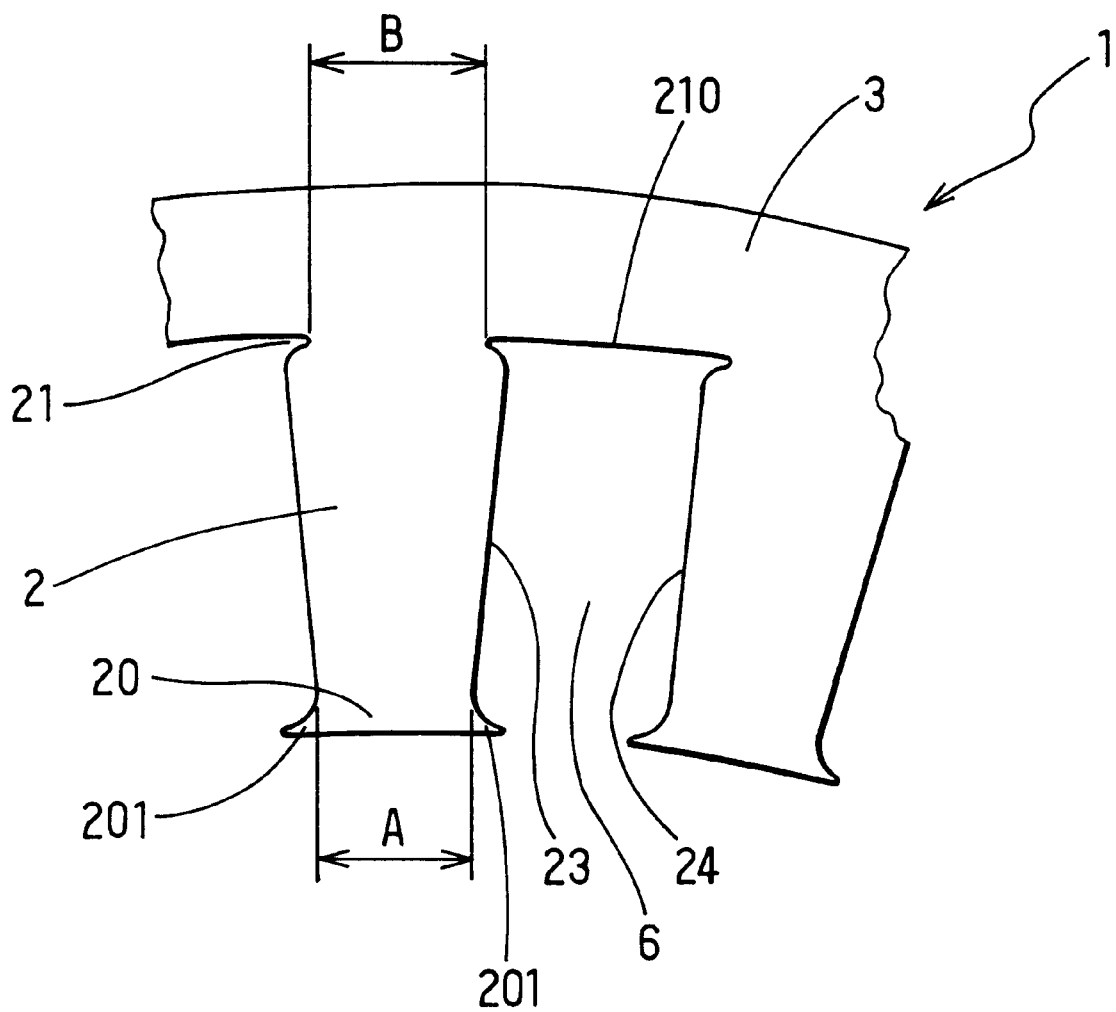
FIG. 1 is a fragmentary enlarged view of an axial end of a stator core of a vehicle AC generator according to a first embodiment of the invention.
Figure 2:
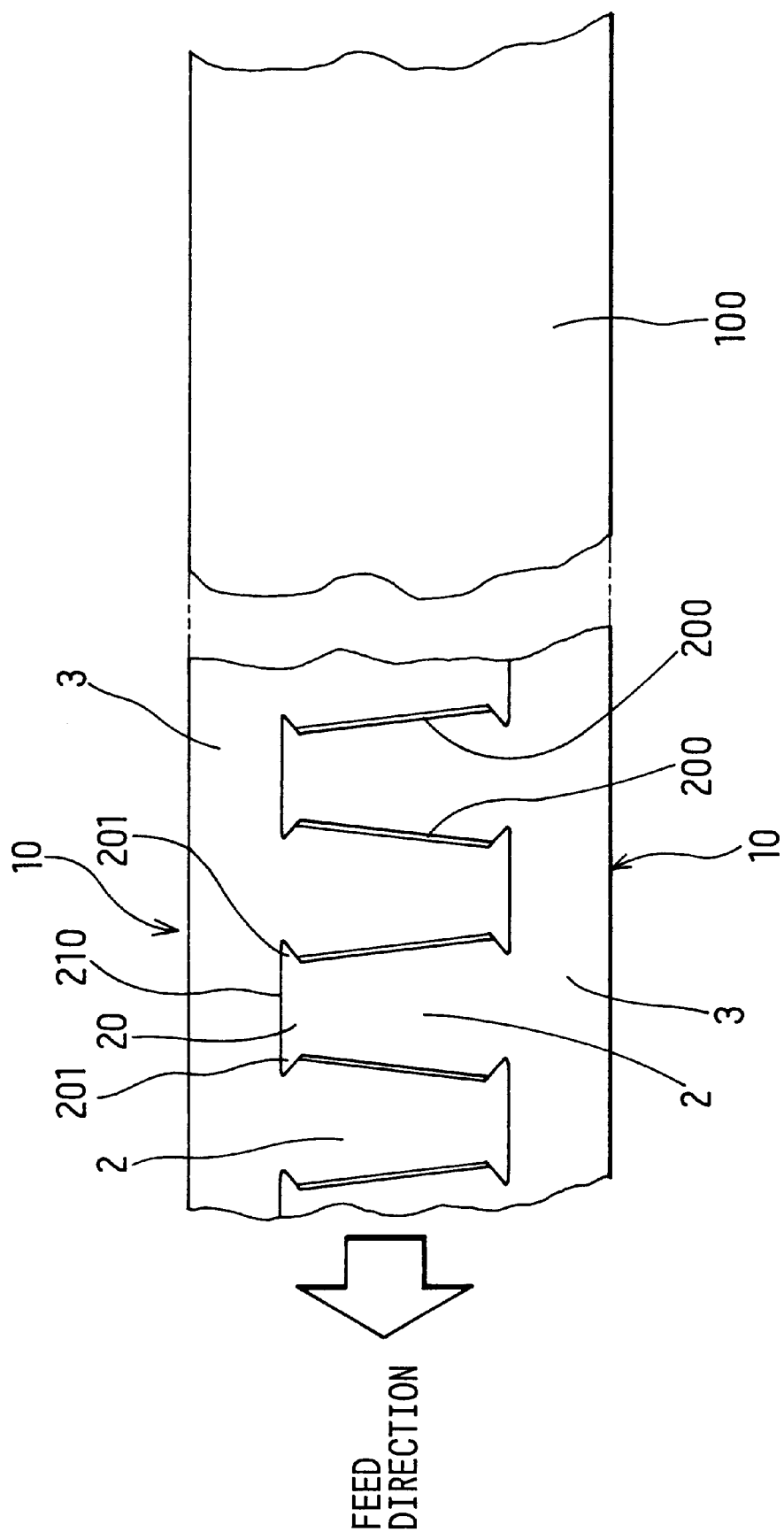
FIG. 2 is an explanatory diagram showing a step of manufacturing a pair of magnetic strips according to the first embodiment from a long and thin magnetic sheet.

The pair of projections 201 is almost the same in shape as a slot bottom 210 that includes the pair of notches 21. When a pair of magnetic strips 10 is formed from a long and thin magnetic sheet 100 such as a hoop of a steel sheet, the tooth edges 20 of one magnetic strip 10 and the slot bottom 210 of the other magnetic strip 10 is sheared and separated without any clearance or margin except for clearances or marginal portions 200 at opposite sides of each tooth 2, as shown in FIG. 2. This increases the yield percentage of the magnetic strip. Because the thickness of the magnetic strip 10 is 0.35 mm, the projections 201 do not deform and keep the magnetic reluctance at a low level.

Thus, the magnetic cross-section of the teeth 2 is the smallest at the base of the projections 201, i.e. at the tooth edge 20 from which the projections extend. In other words, the cross-section of middle portion of the teeth 2 between the base of the projections 201 and the core back 3 is not smaller than the magnetic cross-section at the base of the projections 201. The radial width of each notch 21 is narrowed when the magnetic strip 10 is spirally wound. Accordingly, the magnetic reluctance around the notches 21 is reduced when the stator core 1 is completed.

In addition, a plurality of magnetic strips 10 can be formed from a single long and thin magnetic sheet 100, and the notches 21 make the winding step of the magnetic strip 10 easier.

Figure 6:
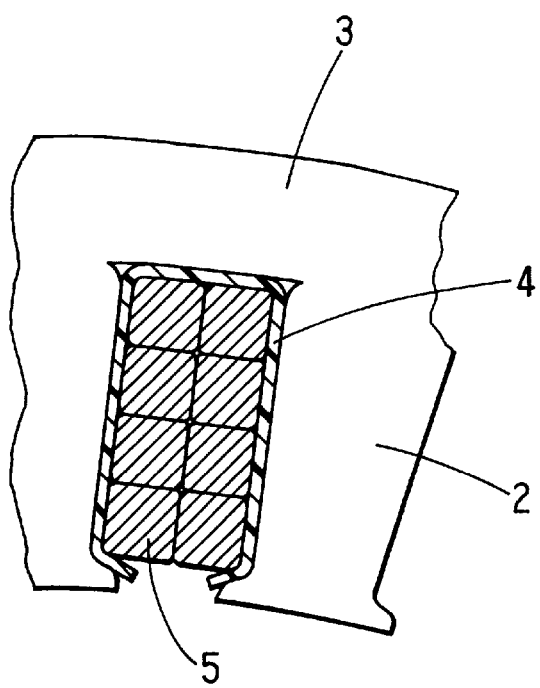
FIG. 6 is a fragmentary cross-sectional view of a stator core according to a variation of the first embodiment of the invention.

Further, the parallel walls 23 and 24 make it easy to align the conductor coils in the slot 6, as shown in FIG. 5 so that a high space factor can be provided, resulting in a high power generator. As a variation, the conductor coils can have a rectangular cross-section to be fitted to the inside walls of each slot 6 including parallel walls, as shown in FIG. 6. This increases the space factor so that more output power can be provided.

Figure 7:
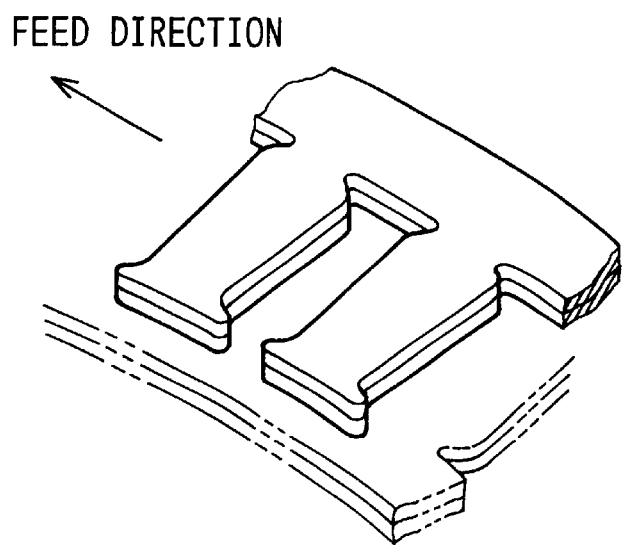
FIG. 7 is an explanatory diagram showing a step of manufacturing magnetic strips according to a second embodiment of the invention.

As a method of manufacturing the stator core according to a second embodiment of the invention, a pair of magnetic strips that is overlapped each other can be stamped as shown in FIG. 7. This step reduces time of manufacturing magnetic strips 10. It is also possible to stamp out three overlapping magnetic strips at one time. Because the thickness of the magnetic strip 10 is comparatively small, the iron loss of the stator core can be reduced to increase the output power.

Figure 8:
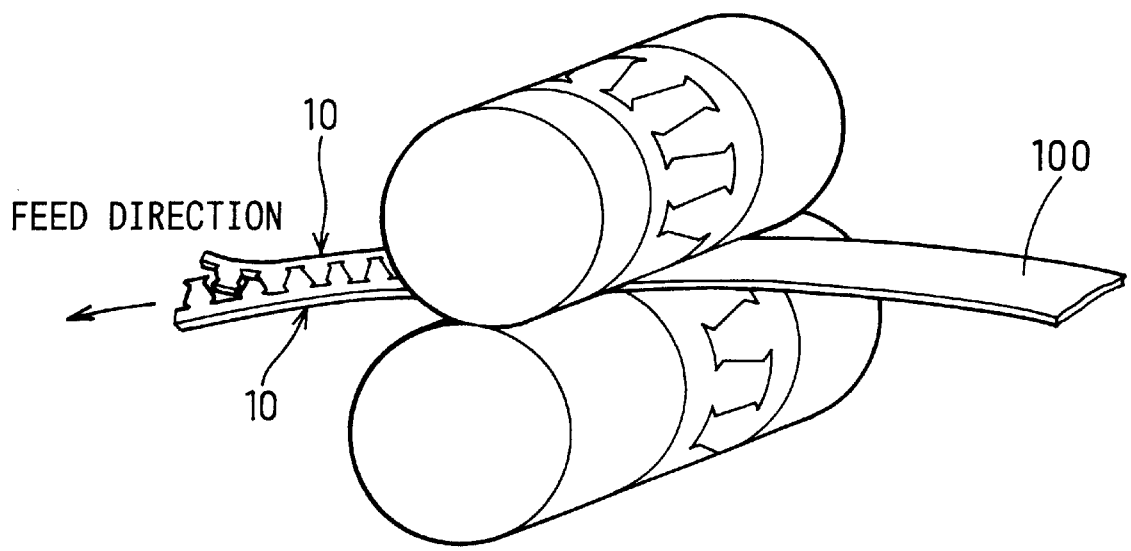
FIG. 8 is an explanatory diagram showing a step of manufacturing magnetic strips according to a third embodiment of the invention.

As a method of manufacturing the stator core according to a third embodiment of the invention, a long magnetic sheet can be loaded between a pair of parallel rollers having a punch and a die to stamp out the magnetic strip 10 continuously, as shown in FIG. 8. Because the magnetic strip 10 can be formed continuously, the production time and cost can be reduced.

The thickness of the magnetic sheets can be changed from 0.35 mm to a thickness between 0.2 mm and 0.5 mm.

Figure 9:
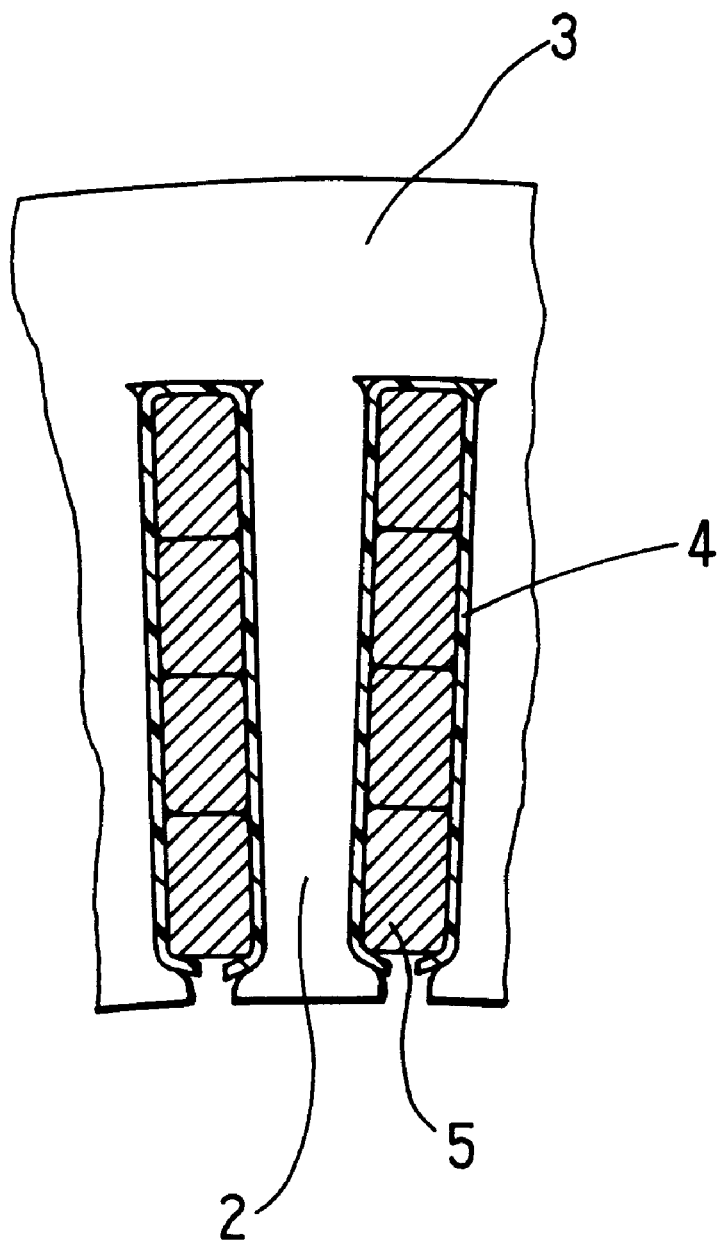
FIG. 9 is a fragmentary cross-sectional view of a stator core according to a fourth embodiment of the invention.

A stator core according to a fourth embodiment of the invention is described with reference to FIG. 9. A unit of the conductor coils 5 can be divided into two groups, and each output power is added to each other. The number of the slots per each unit length of the magnetic sheet becomes twice as many as the number of the slots of the magnetic sheet according to the first embodiment. On the other hand the width of the slots becomes a half the width of the slot of the magnetic sheet according to the first embodiment. Thus, the number of the notches increases so that the magnetic strip can be wound into a more accurate cylindrical shape at a low cost.

Figure 10:
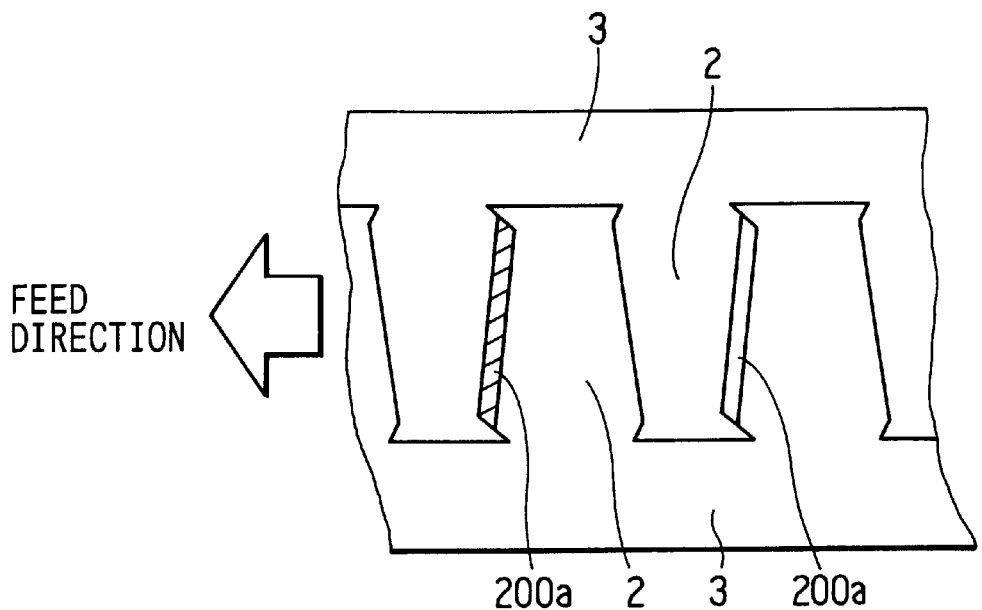
FIG. 10 is an explanatory diagram showing a step of manufacturing magnetic strips according to a fifth embodiment of the invention.
Figure 11:
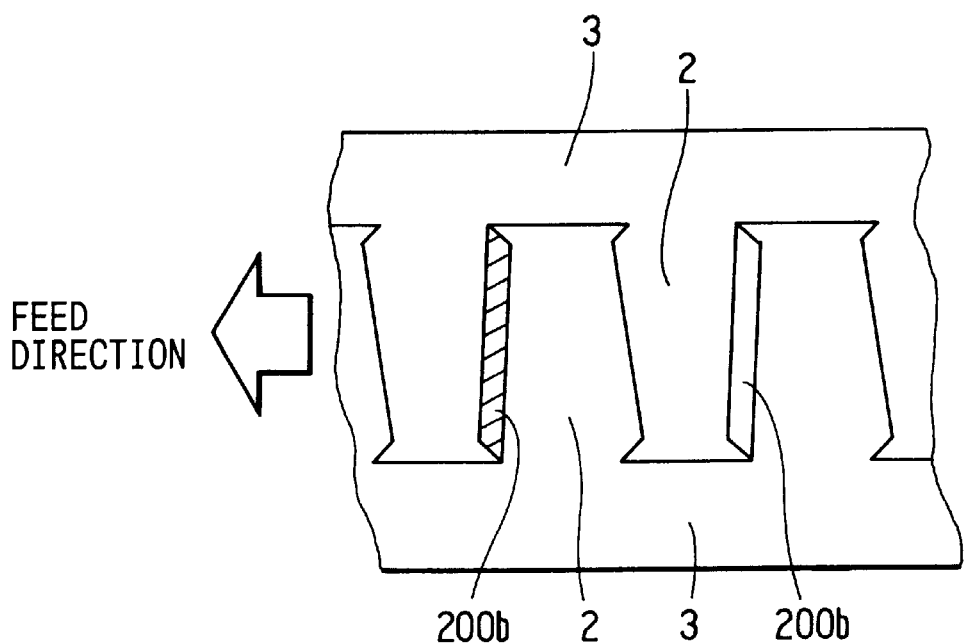
FIG. 11 is an explanatory diagram showing a step of manufacturing magnetic strips according to a variation of the fifth embodiment of the invention.

As a method of manufacturing the stator core according to a fifth embodiment of the invention, the clearance 200a for stamping out can be formed at a side of each tooth 2, as shown in FIG. 10. Because the width of the clearance can be increased, the magnetic strips can be stamped out more easily. The pair of magnetic strips can be formed by the pair of parallel rollers, as shown in FIG. 8.

As a variation, a clearance 200 can be increased until one of the notches at the base of the teeth 2 are removed. This makes the manufacturing steps easier and the manufacturing cost lower.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A stator core of a vehicle rotary electric machine, comprising:

a spirally wound magnetic strip having a core back portion, a plurality of teeth extending radially inward from said core back portion at equal intervals to thereby form a plurality of slots, a slot between each pair of said teeth; wherein each of said teeth has a profile that is approximately complementary to said slot, each of said teeth has at least a circumferential projection at an edge portion thereof and at least a circumferential notch that is approximately complementary to said projection at a base portion thereof adjacent bottoms of said slots, and a circumferential width of said teeth at said base portion is wider than a circumferential width, excluding the pair of circumferential projections, of said teeth at said edge portion.

2. The stator core as claimed in claim 1, wherein the width of said notch is reduced after said strip is wound.

3. The stator core as claimed in claim 1, wherein
   said slot has parallel walls facing each other in circumferential directions.

4. The stator core as claimed in claim 1, wherein
   said magnetic strip is thicker than 0.2 mm and thinner than 0.5 mm.

5. A stator core of a vehicle rotary electric machine, comprising:

a spirally wound magnetic strip having a plurality of teeth extending radially inward at equal intervals and a plurality of slots that is approximately complementary in shape to said teeth formed between each pair of said teeth, wherein each of said teeth has a pair of circumferential projections at opposite sides of a tooth edge thereof and a pair of circumferential notches that has a shape approximately complementary to one of said projections at opposite sides of a base portion thereof adjacent bottoms of said slots, and a circumferential width of said teeth at said base portion is wider than a circumferential width, excluding the pair of circumferential projections, of said teeth at said tooth edge.

6. The stator core as claimed in claim 5, wherein
   said magnetic strip is thicker than 0.2 mm and thinner than 0.5 mm.

7. The stator core as claimed in claim 6, wherein said slot has parallel walls facing each other in circumferential directions.

* * * * *